(12) United States Patent
Villemin et al.

(10) Patent No.: US 6,328,145 B1
(45) Date of Patent: Dec. 11, 2001

(54) IMPACT DAMPING STRUCTURE

(75) Inventors: Marc Villemin, Coisevaux; Albert Metzger, Hartmannswiller, both of (FR)

(73) Assignee: Alstom Holdings, Paris (FR)

( * ) Notice: Subject to any disclaimer, the term of this patent is extended or adjusted under 35 U.S.C. 154(b) by 0 days.

(21) Appl. No.: 09/406,714

(22) Filed: Sep. 28, 1999

(30) Foreign Application Priority Data

Sep. 28, 1998 (FR) .................................................. 98 12103

(51) Int. Cl.$^7$ ...................................................... B16F 7/12
(52) U.S. Cl. ........................................... 188/377; 267/139
(58) Field of Search ............................... 256/13.1; 404/6, 404/9, 10; 188/371, 377, 376; 267/139

(56) References Cited

U.S. PATENT DOCUMENTS

| | | | |
|---|---|---|---|
| 4,029,350 | * 6/1977 | Goupy et al. | 188/377 |
| 4,221,413 | * 9/1980 | Bonnestain | 188/377 |
| 4,227,593 | * 10/1980 | Bricmont et al. | 188/377 |
| 4,352,484 | * 10/1982 | Gertz et al. | 188/377 |
| 4,711,481 | * 12/1987 | Krage et al. | 188/377 |
| 5,461,144 | * 10/1995 | Guardiola et al. | 188/377 |
| 5,715,757 | * 10/1995 | Dannawi et al. | 188/377 |

FOREIGN PATENT DOCUMENTS

| | | | |
|---|---|---|---|
| 0 637 538 | 2/1995 | (EP) . | |
| 0655 565 | 5/1995 | (EP) . | |
| 2 698 932 | 6/1994 | (FR) . | |
| 2 708 691 | 2/1995 | (FR) . | |
| 2063973 | * 6/1981 | (GB) | 188/377 |

* cited by examiner

Primary Examiner—Douglas C. Butler
Assistant Examiner—Devon Kramer
(74) Attorney, Agent, or Firm—Young & Thompson

(57) ABSTRACT

A structure for damping impact by mechanical deformation. The structure has an elongate shape in an impact direction and has a substantially constant cross-section. The structure includes longitudinal plates that form a central chamber and two lateral chambers disposed on either side of the central chamber. The lateral chambers each have a continuous exterior transverse contour. The central chamber has at least one pair of oblique longitudinal plates that are inclined oppositely relative to a plane of symmetry of the structurem, parallel to the impact direction.

17 Claims, 4 Drawing Sheets

IMPACT DAMPING STRUCTURE

BACKGROUND OF THE INVENTION

The invention relates to a structure for damping impact by mechanical deformation, the said structure being of elongate shape in an impact direction and of substantially constant running cross section.

By running section is meant the section over the essential part of the length of the structure for damping impact.

The invention applies in particular to railway vehicles.

The specifications of vehicles carrying passengers, and especially railway vehicles, require the presence of such structures for damping impact which are capable, by virtue of planned mechanical deformation, of absorbing the energy in the event of an accident to save human lives and safeguard equipment.

The energy absorption capacity requirements for such structures are higher and higher at a time when simultaneous efforts are being made to reduce the weights of the vehicles.

Such structures for damping impact must therefore be light and resistant to static forces. Furthermore, in the event of an impact, they must deform by being crushed in the manner of a "concertina", essentially in the impact direction without transverse displacement or corkscrewing.

Document EP-B-621,416 describes such a structure for damping impact which is formed by longitudinal metal plates, welded together. The running cross section of the structure, which is constant in the impact direction, comprises a rectangle whose angles are connected by diagonals which form an X within the rectangle.

In the event of impact, deformation will begin randomly at either of the two longitudinal ends of the structure, which may result in unstable deformation and hence relatively low energy absorption.

Furthermore, it is established that, in the event of an impact, the longitudinal force borne in the impact direction by such a structure first reaches a peak threshold value above which crushing begins, then the longitudinal force declines sharply as a result of which the energy absorbed by the damping structure, equal to the area of the force/deformation curve, is relatively low.

It is therefore desirable to be able to limit the reduction in the longitudinal force borne by the impact damping structure in the course of its deformation.

However, this longitudinal force, corresponding to the acceleration experienced by the passengers in the vehicle, must not be too high for passenger safety.

Finally, it is established that the deformation of such a structure is limited by the accumulation of material taking place at the center of the X of the cross section during the crushing of the structure. Hence, the energy absorption capacity of such a structure is again limited.

SUMMARY OF THE INVENTION

The object of the invention is to solve these problems by providing a structure for damping impact whose deformation in the impact direction is better controlled, having greater stability during crushing, an increased deformation capacity in the impact direction and increased energy absorption capacity, and a relatively low weight, and causing accelerations which are tolerable for the passengers in a vehicle on which the structure is installed.

To this end, the invention relates to a structure for damping impact by mechanical deformation, the said structure being of elongate shape in an impact direction and of substantially constant running cross section, characterized in that the structure comprises longitudinal plates forming a central chamber and two lateral chambers disposed on either side of the central chamber, in that the said lateral chambers each have a continuous exterior transverse contour and in that the central chamber comprises at least one pair of oblique longitudinal plates which are inclined oppositely relative to a plane of symmetry of the structure parallel to the impact direction.

According to particular embodiments, the structure for damping impact may comprise one or more of the following features, taken individually or in any technically possible combination thereof:

- the plates of the said pair of oblique longitudinal plates are connected longitudinally along a common edge parallel to the impact direction, and these oblique plates are connected longitudinally to the rest of the structure upstream of the said common edge;
- the structure comprises a plurality of pairs of oblique longitudinal plates, the oblique plates of each pair being inclined oppositely relative to the said plane of symmetry of the structure, and the said oblique plates define, at least partially, dihedra disposed side by side;
- the said oblique longitudinal plates are connected in pairs along respective edges each common to two directly adjacent oblique plates and, for each common edge, the two corresponding oblique plates are connected longitudinally to the rest of the structure upstream of the said common edge;
- at least some directly adjacent oblique plates partially define a dihedron and are connected longitudinally upstream of the edge of the said dihedron by a longitudinal plate which extends orthogonally to the said plane of symmetry of the structure;
- the central chamber comprises at least one longitudinal plate which extends substantially orthogonally to the said plane of symmetry of the structure, connecting directly adjacent oblique plates;
- the central chamber has a substantially continuous exterior transverse contour;
- the structure comprises transverse reinforcing members which are regularly spaced along the structure within at least one chamber, especially a lateral chamber, and which are solidly fixed to the longitudinal plates of the said chamber;
- at least one longitudinal plate is equipped with means for increasing the longitudinal rigidity of the structure along the structure from a first longitudinal end of the structure forming a commencement end for its deformation; and
- the said means for increasing the longitudinal rigidity of the structure comprise spaced apertures which are areas decreasing from the commencement end of the deformation of the structure.

BRIEF DESCRIPTION OF THE DRAWINGS

The invention will be better understood from a reading of the description which follows, which is given solely by way of example and with reference to the attached drawings, in which.

DETAILED DESCRIPTION OF THE PREFERRED EMBODIMENTS

Figure 1:
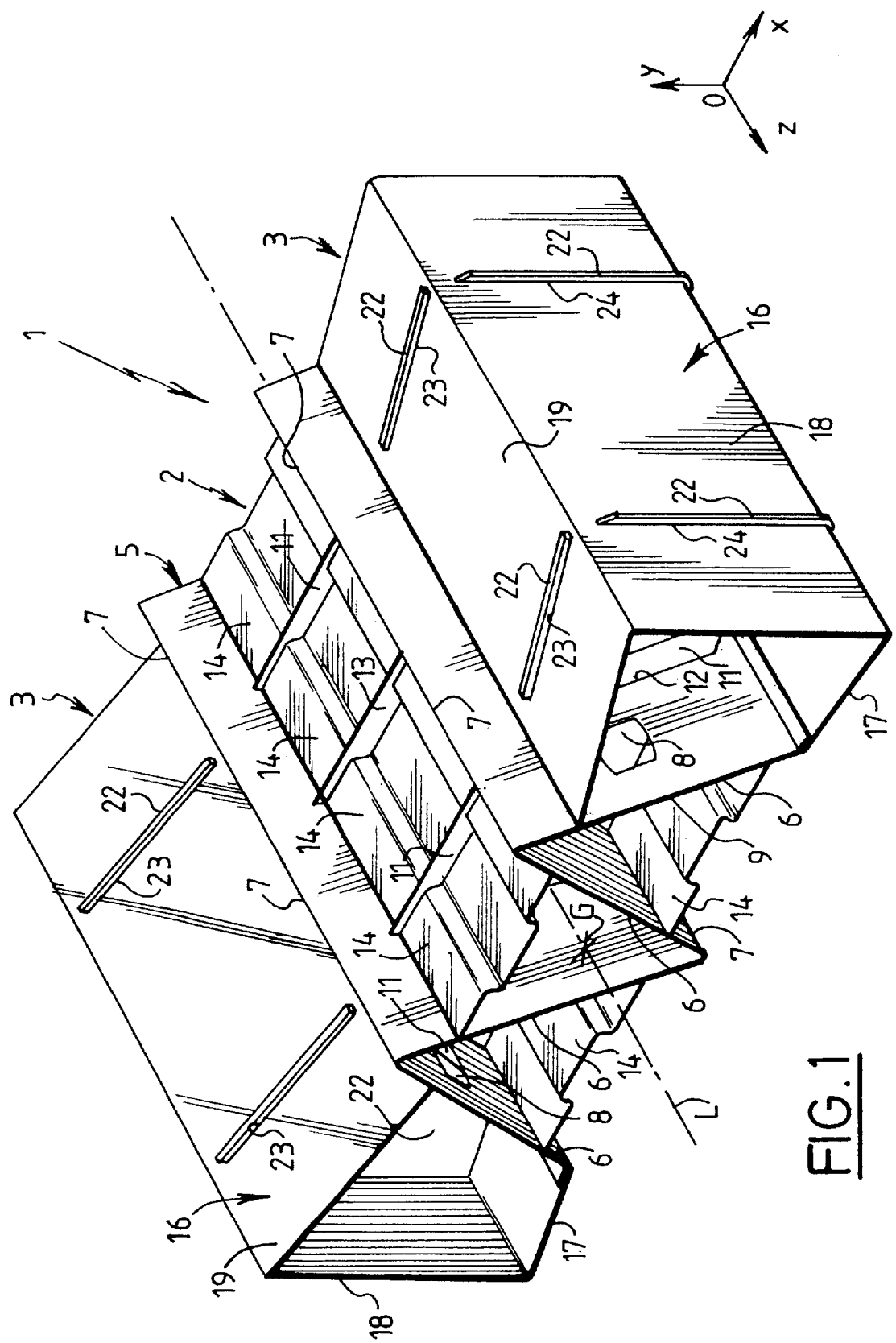
FIG. 1 is a diagrammatic perspective view of a structure for damping impact in accordance with a first embodiment of the invention.

FIG. 1 shows an impact damping structure 1 comprising rigid metal elements welded together.

For ease of description, a direct orthogonal reference 0xyz is shown in FIG. 1.

The structure 1 has a generally elongate shape along the axis 0z, which corresponds to the impact direction.

The structure 1 has a substantially constant running cross section.

The structure 1 essentially comprises longitudinal plates welded together along welding runs parallel to the axis 0z, and forming a central chamber 2 bordered laterally on either side by two lateral chambers 3. The chambers 2 and 3 are oriented in the direction of impact.

The structure 1 is substantially symmetrical relative to a median plane passing through the central line L of the structure 1 and parallel to the plane 0yz.

The central line L is the straight line passing through all the inertia centers G of the successive cross sections of the structure 1. A single inertia center G is shown in FIG. 1.

A more precise description will now be given, with reference to FIGS. 1 and 2, of the constitution of the impact damping structure 1.

The central chamber 2 comprises a corrugated or concertina-type metal sheet 5 which comprises three successive longitudinal folds. Thus, this metal sheet forms four adjacent oblique flat plates 6, oriented longitudinally, which define three dihedra disposed side by side. These plates 6 are inclined in an alternating manner relative to the plane 0yz. The plates 6 are therefore inclined successively oppositely relative to the plane 0yz.

The directly adjacent oblique plates 6 are connected along common edges 7 parallel to the impact direction.

The plates 6 are therefore symmetrical relative to the plane of symmetry of the structure 1 in pairs, specifically one laterally exterior pair of plates 6 and one laterally interior or central pair of plates 6.

Figure 2:
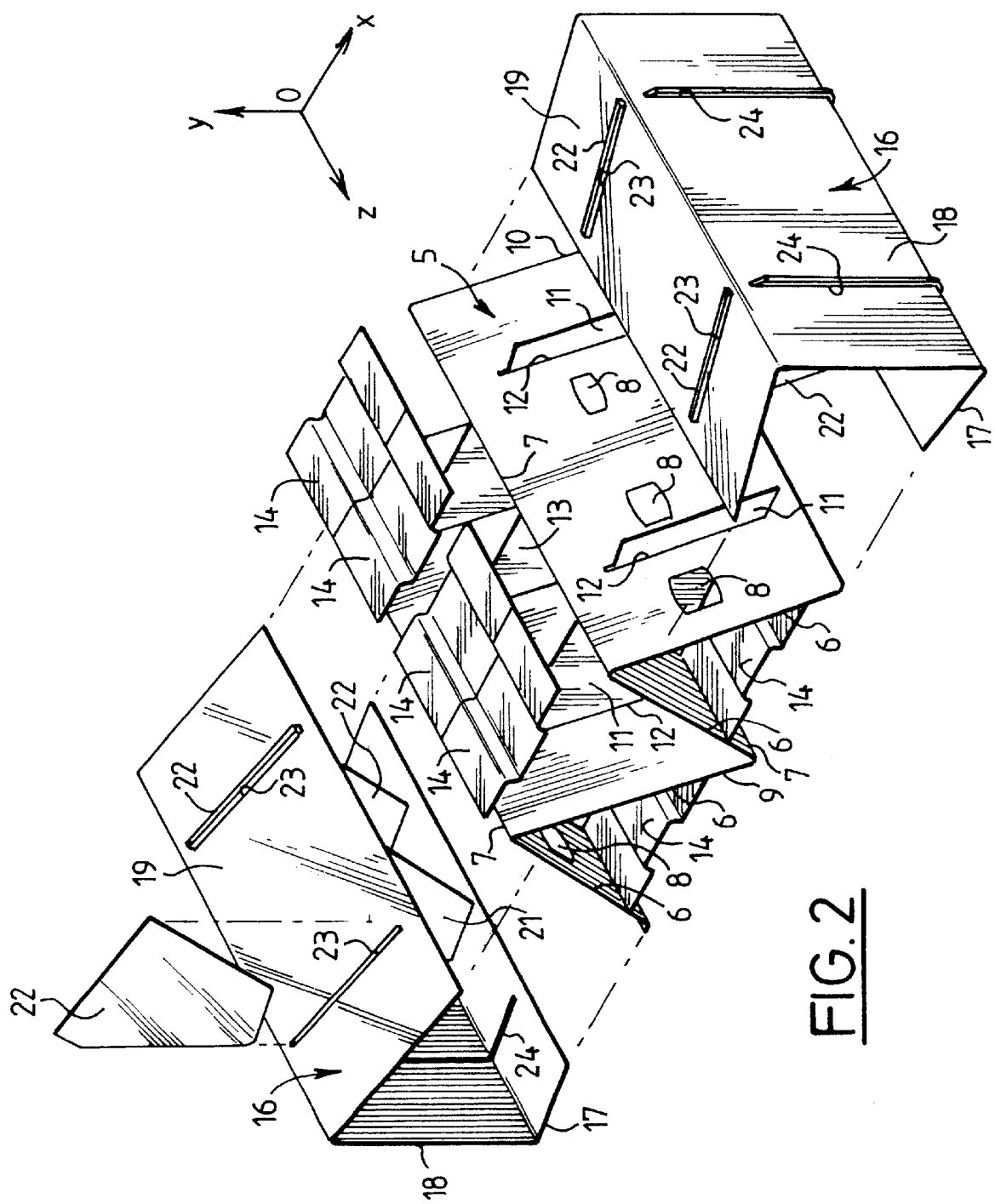
FIG. 2 is an exploded view of the structure according to FIG. 1, and FIGS. 3 and 4 are views analogous to FIG. 1, each illustrating another embodiment of the invention.

Apertures 8 are made in the exterior lateral plates 6 (to the right and left in FIGS. 1 and 2). These apertures 8, of generally rectangular shape, are regularly spaced along these plates 6.

For each exterior lateral plate 6, three apertures 8 are made with areas decreasing from a first longitudinal end 9 of the structure 1 towards the second longitudinal end 10 of the structure 1.

Two principal transverse stiffeners or reinforcing members 11 extend transversely to the metal sheet 5, successively passing through all the plates 6 via slits 12, and projecting laterally outside the metal sheet 5.

The stiffeners 11 are plates in the form of isosceles trapezoids.

The principal transverse stiffeners 11 are spaced apart from one another along the impact direction 0z and are welded to all the oblique plates 6.

An auxiliary transverse stiffener or reinforcing member 13, of flat triangular shape, extends within the chamber 2 between the two central oblique plates 6 to which it is welded.

This auxiliary stiffener 13 is disposed between the principal stiffeners 11, substantially equidistant therefrom.

For each laterally exterior plate 6, an aperture 8 is made between the end 9 of the structure 1 and the adjacent slit 12, and two apertures 8 are made between the two slits 12.

Finally the central chamber 2 comprises ten longitudinal webs 14, of Ω-shaped cross section, which link the oblique plates 6 to each other, extending orthogonally to the plane of symmetry of the structure 1.

The webs 14 are disposed in groups, the webs 14 of a single group extending successively longitudinally.

Thus, a group of four webs 14 links the two laterally interior or central oblique plates 6, the transverse stiffeners 11 and 13 being interposed between these webs 14. These webs 14 are welded to the central plates 6 and to the transverse stiffeners 11 and 13.

Similarly, two groups of three webs 14 link the oblique plates 6 situated on either side of the plane of symmetry of the structure 1.

For each of these groups of three webs 14, the principal transverse stiffeners 11 are interposed between the webs 14.

It is to be noted that all the webs 14 and the transverse stiffeners 11 and 13 are welded to the oblique plates 6 upstream of the edges 7 of the corrugated metal sheet 5.

The central chamber 2 has a substantially continuous transverse exterior contour.

Because of the symmetry of the structure 1, only the left-hand lateral chamber 3 (in FIGS. 1 and 2) will now be described.

This chamber 3 comprises a folded longitudinal metal sheet 16, of substantially C-shaped cross section, with one arm converging towards the other.

Thus, the metal sheet 16 comprises a lower plate 17 (in FIGS. 1 and 2) substantially parallel to the plane 0xz, a vertical lateral plate 18 parallel to the plane 0yz, and an upper plate 19 inclined relative to the plane 0xz.

This metal sheet 16 is welded to the left-hand exterior lateral oblique plate 6 of the chamber 2, upstream of the adjacent edge 7, so that the left-hand lateral chamber 3 has a substantially continuous exterior contour in the form of a quadrate.

The left-hand lateral chamber 3 further comprises transverse stiffeners or reinforcing members 21, 22, regularly spaced along the axis Oz. A central stiffener 21 is disposed entirely within the chamber 3 and welded to the metal sheet 16 and to the left-hand exterior lateral oblique plate 6.

Two stiffeners 22, situated on either side of the central stiffener 21, each extend into the interior of the left-hand lateral chamber 3 and project to the exterior of the latter via two slits 23 and 24.

The slits 23 are made in the upper plate 19 and the slits 24 extend into the lateral plate 17 and lower plate 18.

The stiffeners 22 are each welded, in the region of an overlap zone, to a part of a principal stiffener 11 projecting laterally relative to the corrugated metal sheet 5. Furthermore, these stiffeners 22 are welded to the plates 17, 18 and 19, by virtue of their projecting parts, on the exterior of the lateral chamber 3.

The structure 1 is intended to be incorporated, for example, into the ends of the chassis of a rail vehicle to absorb an impact occurring in the direction 0z by crushing of the structure 1 in that direction.

It is established that, in the event of such an impact, the deformation by crushing commences in the area of the end 9 of the structure 1 and spreads gradually towards the end 10 of the structure 1. This planned deformation of the structure is ensured by virtue of the decreasing areas of the apertures 8, which make it possible progressively to increase the longitudinal rigidity of the structure 1 along the latter from its end 9.

Moreover, the presence of the transverse stiffeners 11, 13, 21 and 22 makes it possible to stagger the deformation of the structure 1 and thus to achieve a planned deformation corresponding to that required by a specification.

In addition, by virtue of the symmetry of the structure 1 and of the inclination of the oblique plates 6 relative to the plane of symmetry of the structure 1, deformation is essentially ensured by dynamic plastic buckling along the axis $0z$, and the structure 1 remains stable during the deformation without slipping transversely or corkscrewing.

The fact that the oblique plates 6 are linked, especially longitudinally, to the rest of the structure 1 upstream of the edges 7 confers increased freedom of deformation by buckling, without arresting that deformation in the area of the edges 7 by accumulation of material.

Finally, the fact that the exterior transverse contours of the lateral chambers 3 and central chambers 2 are continuous also helps to limit the risks of transverse displacement of the structure 1 or of corkscrewing during the deformation.

This feature likewise confers, in particular in the case of the lateral chambers 3, a satisfactory resistance to static forces and allows the satisfactory longitudinal and transverse support of the structure 1 on adjacent elements of the vehicle chassis.

Thus the structure 1, which is of air-containing design and therefore relatively lightweight, makes it possible to obtain a substantial, controlled and planned deformation with a relatively high level of energy absorption.

Specifically, the structure 1 may be deformed over more than 70% of its length and bear continuous stabilized dynamic forces of the order of 6000 kN, corresponding to an acceleration that can be tolerated by the vehicle passengers.

Figure 3:
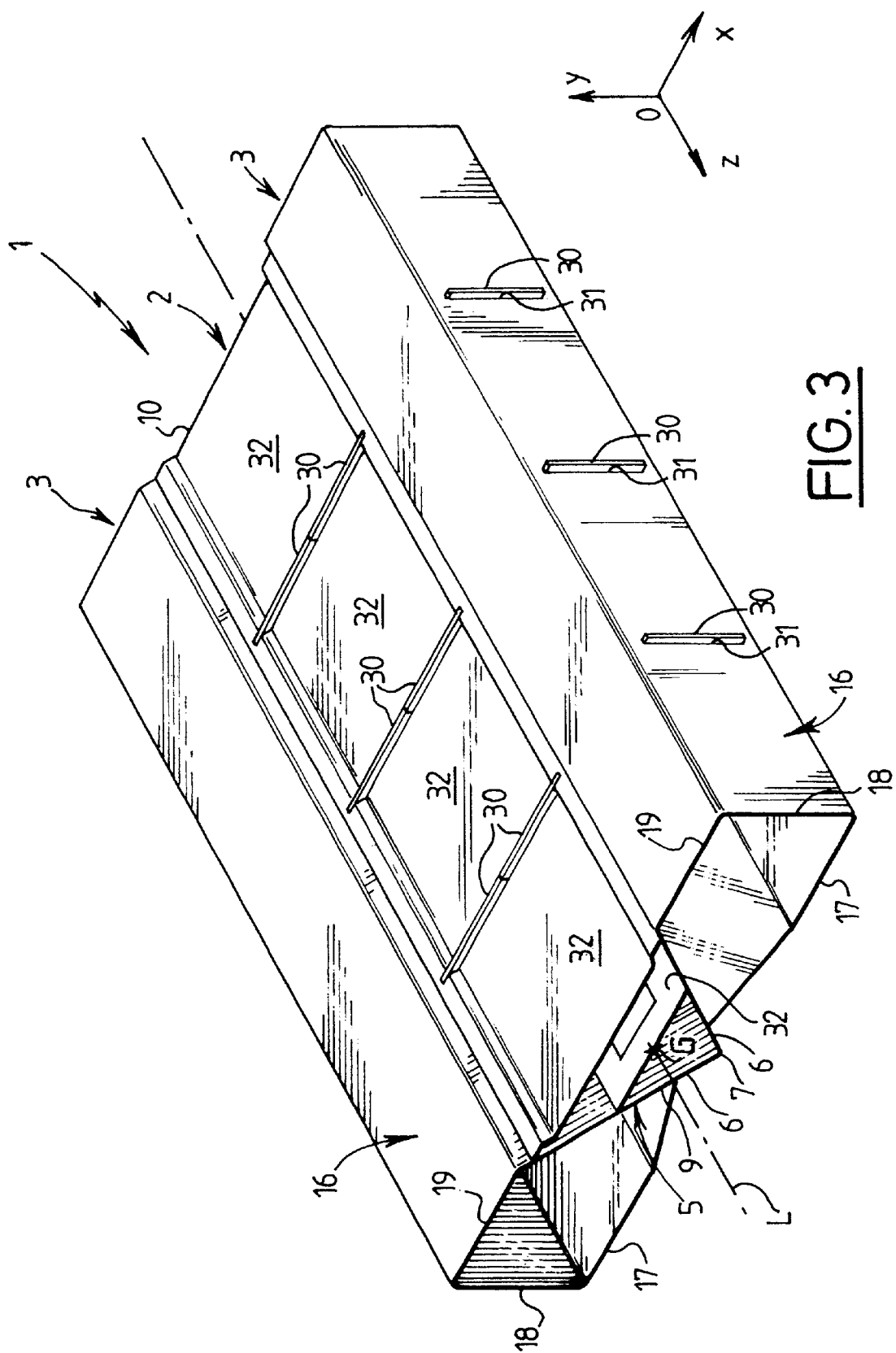

FIG. 3 illustrates a second embodiment of the invention, according to which the central chamber 2 of the impact damping structure 1 comprises a single longitudinal fold and therefore a single pair of oblique plates 6 which are symmetrical relative to the plane of symmetry of the structure 1.

The plates 6 are linked, especially longitudinally, to the rest of the structure 1, and in particular to the lower plates 17 of the lateral chambers 3, upstream of their common edge 7. To do this, the lower plates 17 of the lateral chambers 3 ascend (in FIG. 3) towards the central line L of the structure 1.

The structure 1 comprises three pairs of transverse stiffeners 30. The stiffeners 30 of a single pair are prolonged transversely and thus extend over the entire width (according to the axis $0x$) of the structure 1.

The stiffeners 30 of a single pair meet at the plane of symmetry of the structure 1, in other words the plane passing through the line L and parallel to the plane $0yz$, and each pass through an oblique plate 6 and the exterior lateral plate 18 of a lateral chamber 3 via a slit 31.

Two groups of four longitudinal webs 32 extend one above the other between the oblique plates 6 over the entire length of the structure 1. The webs 32 of each group are successively prolonged longitudinally, and the transverse stiffeners 30 are interposed between the webs 32 which are welded to the transverse stiffeners 30 and to the oblique plates 6.

It will be noted that the positioning of the webs 32 and the presence of the slits 31 makes it possible to weld the transverse stiffeners 30 to the rest of the structure 1, in part from the exterior thereof.

Some of the webs 32 of the group located within the structure 1 (at the bottom in FIG. 3), and therefore in the vicinity of the edge 7, are equipped with apertures 8 making it possible to increase the longitudinal rigidity of the structure 1 from the end 9. Thus, an aperture 8 is made in each of the first three webs 32 from the end 9 of the structure 1. The apertures 8 have areas decreasing from the longitudinal end 9 of the structure 1.

This second embodiment also makes it possible to achieve the objectives defined at the outset of the description.

Figure 4:
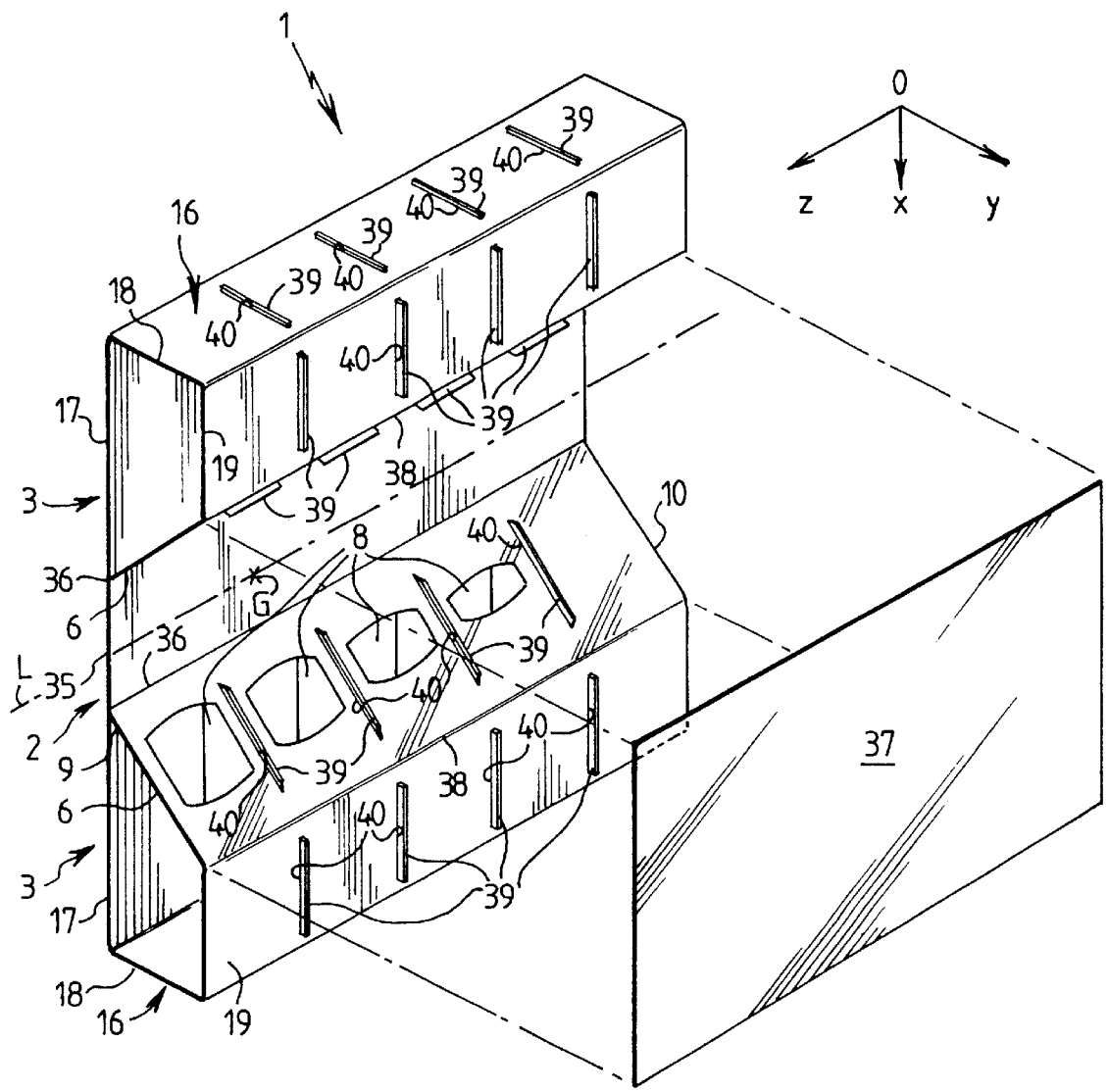

FIG. 4 shows another embodiment, which differs essentially from that in FIG. 3 in that the two oblique plates 6 are not linked along a common edge but are linked via a longitudinal plate 35 orthogonal to the plane of symmetry of the structure 1. This plate 35 is situated upstream of the edge of the dihedron defined by the oblique plates 6.

The plates 6, 17, 18, 19 and 35 belong to a single metal sheet whose edges have been folded back to form the lateral chambers 3. The central longitudinal edges 36 of the oblique plates 6 are welded to the longitudinal plate 35.

Another longitudinal plate 37, shown separately from the rest of the structure 1 in FIG. 4, is welded to the laterally exterior longitudinal edges 38 of the oblique plates 6.

In this embodiment, four apertures 8 of areas decreasing from the end 9 have been made in each oblique plate 6.

Each lateral chamber 3 comprises four interior transverse stiffeners 39 in the general shape of a trapezoid interposed between the corresponding apertures 8. These transverse stiffeners are welded to the exterior of the plates 17, 18, 19 and 6 by virtue of the presence of slits 40 made in these plates, through which the stiffeners 39 project to the exterior of the lateral chamber 3 in question.

As is illustrated by FIG. 4, the impact damping structure 1 according to the invention may be placed in various positions. Thus, the structure 1 may be positioned to damp an impact occurring in a direction which is not necessarily horizontal. The structure 1 according to the invention may, for example, be incorporated into a chassis to absorb a vertical impact.

More generally, the number of transverse stiffeners and apertures 8 may vary as a function of a given specification.

Moreover, the apertures 8 may be replaced by sleeves or reinforcing plates of areas increasing along the structure 1 from the end 9 of commencement of deformation.

Finally, such an impact damping structure may be fitted on vehicles other than rail vehicles.

What is claimed is:

1. A structure for damping impact by mechanical deformation comprising:

longitudinal plates forming a central chamber, said central chamber having at least one pair of said longitudinal plates, said at least one pair of longitudinal plates being a pair of oblique longitudinal plates that are inclined oppositely relative to at plane of symmetry of the structure, parallel to the impact direction; and two lateral chambers being spaced apart from each other, said central chamber being between said lateral chambers, said lateral chambers each having a continuous exterior transverse contour, said structure being of elongate shape in an impact direction, having a substantially constant cross-section, and being substantially symmetrical relative to the plane of symmetry, wherein at least two oblique plates are directly adjacent each other and partially define a dihedron, said oblique plates are connected longitudinally upstream of an edge of said dihedron by a longitudinal plate, said longitudinal plate extends orthogonally to the plane of symmetry of the structure.

2. A structure for damping impact by mechanical deformation comprising:

longitudinal plates forming a central chamber, said central chamber having at least one pair of said longitudinal plates, said at least one pair of longitudinal plates being a pair of oblique longitudinal plates that are inclined oppositely relative to a plane of symmetry of the structure, parallel to the impact direction; and two lateral chambers being spaced apart from each other, said central chamber being between said lateral chambers, said lateral chambers each having a continuous exterior transverse contour, said structure being of elongate shape in an impact direction, having a substantially constant cross-section, and being substantially symmetrical relative to the plane of symmetry, wherein said central chamber further comprises at least one longitudinal linking plate extending substantially orthogonal to the plane of symmetry of the structure and connecting directly adjacent oblique plates.

3. A structure for damping impact by mechanical deformation comprising:

longitudinal plates forming a central chamber, said central chamber having at least one pair of said longitudinal plates, said at least one pair of longitudinal plates being a pair of oblique longitudinal plates that are inclined oppositely relative to a plane of symmetry of the structure, parallel to the impact direction;

two lateral chambers being spaced apart from each other, said central chamber being between said lateral chambers, said lateral chambers each having a continuous exterior transverse contour; and transverse reinforcing members which are regularly spaced along said structure within at least one of said central or said lateral chambers and which are solidly fixed to the longitudinal plates of said central chamber, said structure being of elongate shape in an impact direction, having a substantially constant cross-section, and being substantially symmetrical relative to the plane of symmetry.

4. The structure according to claim 1 wherein at least one longitudinal plate has means for increasing longitudinal rigidity of said structure along the structure from a first longitudinal end of the structure, said means forming a commencement end for the deformation of the structure.

5. The structure according to claim 4 wherein said means comprise spaced apertures, areas of said apertures decrease from the commencement end.

6. The structure according to claim 1, wherein said at least one pair of oblique longitudinal plates are connected longitudinally along a common edge parallel to the impact direction, said oblique plates being connected lonitudinally to the rest of the structure upstream of said common edge.

7. The structure according to claim 1, further cdomprising a plurality of pairs of said oblique longitudinal plates, the oblique plates of each said plurality of pairs being inclined oppositely relative to the plane of symmetry of the structure, said plurality of pairs of oblique plates define, at least partially, dihedra disposed side by side.

8. The structure according to claim 7, wherein said plurality of pairs of oblique lonitudinal plates are connected in pairs along respective edges common to two directly adjacent oblique plates are connected lonitudinally to the rest of the structure upstream of said common edge.

9. The structure according to claim 1, wherein said central chamber has a substantially continuous exterior of transverse contour.

10. The structure according to claim 2, wherein said at least one pair of oblique longitudinal plates are connected lonitudinally along a common edge parallel to the impact direction, said oblique plates being connected longitudinally to the rest of the structure upstream of said common edge.

11. The structure according to claim 2 further comprising a plurality of pairs of said oblique longitudinal plates, the oblique plates of each said plurality of pairs being inclined oppositely relative to the plane of symmetry of the structure, said plurality of pairs of oblique plates define, at least partially, dihedra disposed side by side.

12. The structure according to claim 11 wherin said plurality of pairs of oblique longitudinal plates are connected in pairs along respective edge common to two directly adfacent obliwue plates for each common edge, said two corresponding oblique plates are connected longitudinally to the rest of the structure upstream of said common edge.

13. The structure according to claim 2, wherein said central chamber has a substantially continuous exterior of transverse contour.

14. The structure according to claim 3, wherein said at least one pair of oblique longitudinal plates are connected lonitudinally along a common edge parallel to the impact direction, said oblique plates being connected longitudinally to the rest of the structure upstream of said common edge.

15. The structure according to claim 3 further comprising a plurality of pairs of said oblique longitudinal plates, the oblique plates of each said plurality of pairs being included oppositely relative to the plane of symmetry of the structure, said plurality of pairs if oblique plates define, at least partially, dihedra disposed side by side.

16. The structure according to claim 15 wherein said plurality of pairs of oblique lonit udinal plates are connected in pairs along respective edges common to two directly adjacent oblique plates for each common edge, said two corresponding oblique plates are connected lonitudinally to the rest of the structure upstream of said common edge.

17. The structure according to claim 3, wherein said central cahamber has a substantially continuous exterior of transverse contour.

* * * * *